US012320290B2

(12) United States Patent
Onoda et al.

(10) Patent No.: US 12,320,290 B2
(45) Date of Patent: Jun. 3, 2025

(54) RADIATOR PIPE RETENTION STRUCTURE

(71) Applicant: TOYOTA JIDOSHA KABUSHIKI KAISHA, Aichi-ken (JP)

(72) Inventors: Tetsuya Onoda, Kariya (JP); Hiroshi Shimasaki, Nisshin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 333 days.

(21) Appl. No.: 18/182,389

(22) Filed: Mar. 13, 2023

(65) Prior Publication Data

US 2023/0296044 A1 Sep. 21, 2023

(30) Foreign Application Priority Data

Mar. 16, 2022 (JP) ................................. 2022-040969

(51) Int. Cl.
*F01P 11/04* (2006.01)

(52) U.S. Cl.
CPC .................................... *F01P 11/04* (2013.01)

(58) Field of Classification Search
CPC .......... B60K 11/02; B60K 11/06; F01P 11/04; B62D 25/084
See application file for complete search history.

(56) References Cited

U.S. PATENT DOCUMENTS 5,464,256 A * 11/1995 Godeau ............. F02M 37/0017 285/305
6,516,906 B2 * 2/2003 Sasano ..................... F01P 11/04 296/203.02
6,676,283 B2 * 1/2004 Ozawa ................. B62D 25/084 362/802
6,749,007 B2 * 6/2004 Ehlers ....................... F01P 3/18 165/41
6,800,385 B2 * 10/2004 Harth ..................... B60K 11/02 429/456
7,478,611 B2 * 1/2009 Yoshida ................ F28F 9/0246 123/41.1
9,562,634 B2 * 2/2017 Hoehn ..................... B60H 1/04
11,420,684 B2 * 8/2022 Hayakawa ........... B62D 25/084
11,428,148 B2 * 8/2022 Dong ..................... F01P 11/029
11,766,915 B2 * 9/2023 Hwang ..................... F01P 5/10 165/202
2009/0152902 A1 * 6/2009 Sugasaki ................ B60K 13/02 296/203.02

(Continued)

FOREIGN PATENT DOCUMENTS

JP 201787751 A 5/2017
JP 2020157898 A 10/2020
JP 2022-182643 A 12/2022

*Primary Examiner* — Jeffrey J Restifo
(74) *Attorney, Agent, or Firm* — HAUPTMAN HAM, LLP

(57) ABSTRACT

The radiator pipe holding structure is equipped with a square cylindrical shaped air guide duct. The air guide duct is located between the radiator and the front grille. The air guide duct extends in the longitudinal direction of the vehicle. Furthermore, the air guide duct surrounds the front surface of the radiator. The air guide duct also has a duct wall. The duct wall is part of a square cylindrical shape. The duct wall has a retaining portion. The retaining portion holds the cylindrical pipe. The portion has a partially cut bellows. The shape of the ridge and valley portions is an open ring with the ridge and valley portions partially removed.

5 Claims, 8 Drawing Sheets

(56) References Cited

U.S. PATENT DOCUMENTS

2015/0308754 A1* 10/2015 Gautier ................. F16L 23/032
165/177
2023/0296044 A1* 9/2023 Onoda .................. B60K 11/04
180/68.1

* cited by examiner

RADIATOR PIPE RETENTION STRUCTURE

CROSS REFERENCE TO RELATED APPLICATION

This application claims priority to Japanese Patent Application No. 2022-040969, filed on Mar. 16, 2022, which is incorporated herein by reference in its entirety including the specification, claims, drawings, and abstract.

TECHNICAL FIELD

A radiator pipe retention structure is disclosed herein.

BACKGROUND

Refrigerants are used to cool internal combustion engines. Refrigerant also flows to onboard air conditioning equipment. To dissipate the heat of the refrigerant, the vehicle is equipped with a radiator. Air from outside the vehicle is drawn in through the front grille at the front of the vehicle. This air is sent to the radiator.

The radiator is rectangular in shape. The radiator has its main surface facing the front of the vehicle. The radiator is supported by a radiator support. The radiator support is a rectangular frame member. The radiator is fitted into the radiator support. For example, in JP2017-87751A, a pipe is passed through the gap between the radiator and radiator support. In addition, the area around the pipe is sealed by a panel material. The gap between the radiator and the radiator support is filled with the panel material. As a result, leakage of cooling air from the sides of the radiator is suppressed.

JP2020-157898A also discloses a duct (hose) that connects the engine to the air cleaner. The duct is cylindrical tubular. For noise suppression, the engine is surrounded by a bulkhead. The bulkhead has an opening. In addition, a bellows member is provided in the aperture. The ridge and valley sections are concentrically arranged in alternating directions. A duct is passed through the center hole of the bellows member. This retention structure seals the gap between the duct and the bulkhead even during engine vibration. As a result, noise leakage is suppressed.

By the way, when a cylindrical pipe such as a hose or duct is held by a ring-shaped bellows member, a process of inserting the pipe into the center hole of the bellows member occurs. If the pipe is long, this insertion process may take a long time.

Therefore, a retaining structure for a radiator pipe is disclosed herein. According to this retaining structure, the cylindrical pipe is retained by the bellows structure. In this retention, the process of attaching the cylindrical pipe to the bellows structure can be performed in a shorter time than before.

SUMMARY

Disclosed herein is a retaining structure for a radiator pipe. The retaining structure holds a cylindrical pipe. The cylindrical pipe is connected to a refrigerant port. The refrigerant port is located on the front surface of the radiator. A front grille is placed in front of the radiator. The holding structure is equipped with a square cylindrical air guide duct. The air guide duct is located between the radiator and the front grille. The air guide duct extends in the longitudinal direction of the vehicle. Furthermore, the air guide duct surrounds the front surface of the radiator. The air guide duct also has a duct wall. The duct wall is part of a square cylindrical shape. The duct wall has a retaining portion. The retaining portion holds the cylindrical pipe. The portion has a partially cut bellows. The ridge and valley portions are concentrically alternating. The shape of the ridge and valley portions is a partially removed and open ring.

According to the above configuration, a retaining portion is provided on the duct wall of the air guide duct. The portion holds the cylindrical pipe. The holding portion has a partially cut bellows portion, into which the cylindrical pipe is fitted from the open end of the partially cut bellows portion. The cylindrical pipe is thus held by the duct wall.

In the above configuration, the duct wall may be a side wall of an air guide duct. The side wall has a short section and a long section. The short section has a relatively short length in the longitudinal direction of the vehicle. The long section is located below the short section. The long section extends further forward than the front edge of the short section. A partially cut bellows portion is formed at the upper end edge of the long portion, and the partially cut bellows portion is open at the top.

For example, the front end of the air guide duct is extended to the rear end of the front grille. In addition, a partially cut bellows portion is located at the front end of the air guide duct. In such cases, it is necessary to expose the open end of the partially cut bellows portion when installing and removing the cylindrical pipe. In order to expose the open end, it may be necessary to remove the front grille from the vehicle body. In contrast, as shown in the above configuration, the partially cut bellows portion is placed at the upper edge of the long portion. Furthermore, the open end of the partially cut bellows portion is provided above. This allows a worker to access the open end of the partially cut bellows portion from above the engine compartment without having to remove the front grille.

In the above configuration, a straight edge may be formed on the front edge of the short section. The straight edge is extended in a vertical direction. In this case, the open end of the partially cut bellows portion is connected to the lower end of the straight edge.

According to the above configuration, a cylindrical pipe can be fitted into a partially cut bellows portion using the straight edge as a guide.

In the above configuration, the radiator pipe retaining structure may be provided with auxiliary side pieces. The auxiliary side piece covers the cutout forward of the short section.

According to the above configuration, leakage of cooling air from the cutout is suppressed.

In the above configuration, a sealing strip may be provided at the circumferential end of the partially cut bellows portion. The sealing strip closes the circumferential end.

The partially cut bellows portion has a ridge portion and a valley portion, and the ridge portion and the valley portion form a groove with a V-shaped cross section. According to the above configuration, leakage of cooling air from the groove to the outside of the air guide duct is suppressed.

A radiator pipe retention structure is disclosed herein. According to this retaining structure, the cylindrical pipe is retained by the bellows structure. In this retention, the process of attaching the cylindrical pipe to the bellows structure can be performed in a shorter time than before.

DESCRIPTION OF EMBODIMENTS

The following is a description of an embodiment of a radiator pipe holding structure. Drawings are utilized in this description. The shapes, materials, number of pieces, and numerical values described below are examples for illustrative purposes, and may be changed as necessary according to the specifications of the electronic device unit and support structure. In addition, the same symbol is attached to equivalent elements in all drawings below.

In FIGS. 1-8, a Cartesian coordinate system is used to represent the position and direction of each configuration. The Cartesian coordinate system consists of the FR, RW, and UP axes. The FR axis is the vehicle front/rear axis with the forward direction; the RW axis is the vehicle width axis with the right side direction; and the UP axis is the vehicle vertical axis with the upward direction.

Figure 1:
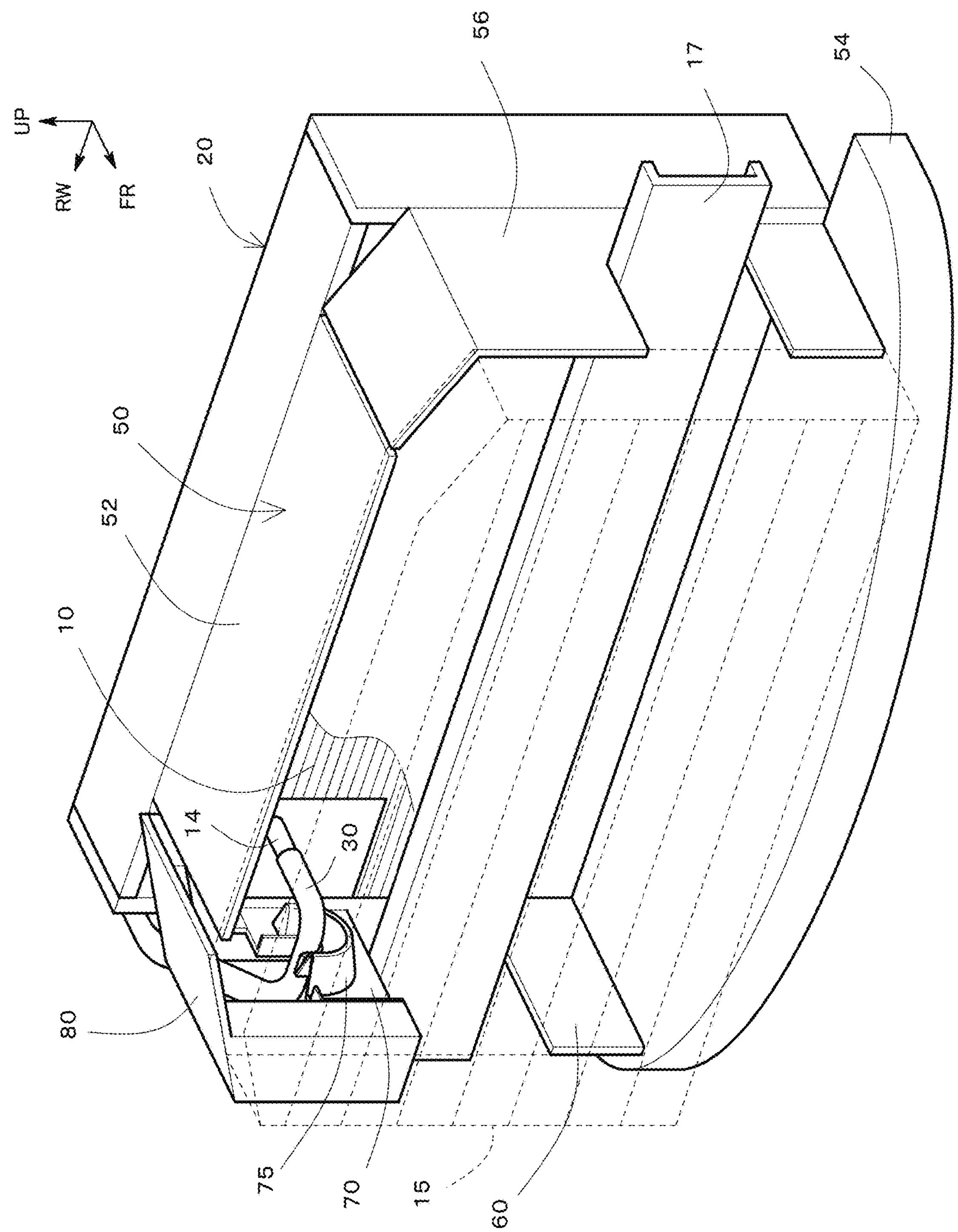
FIG. 1 illustrates the front portion of a vehicle. This forward portion includes the holding structure for the radiator pipe.
Figure 2:
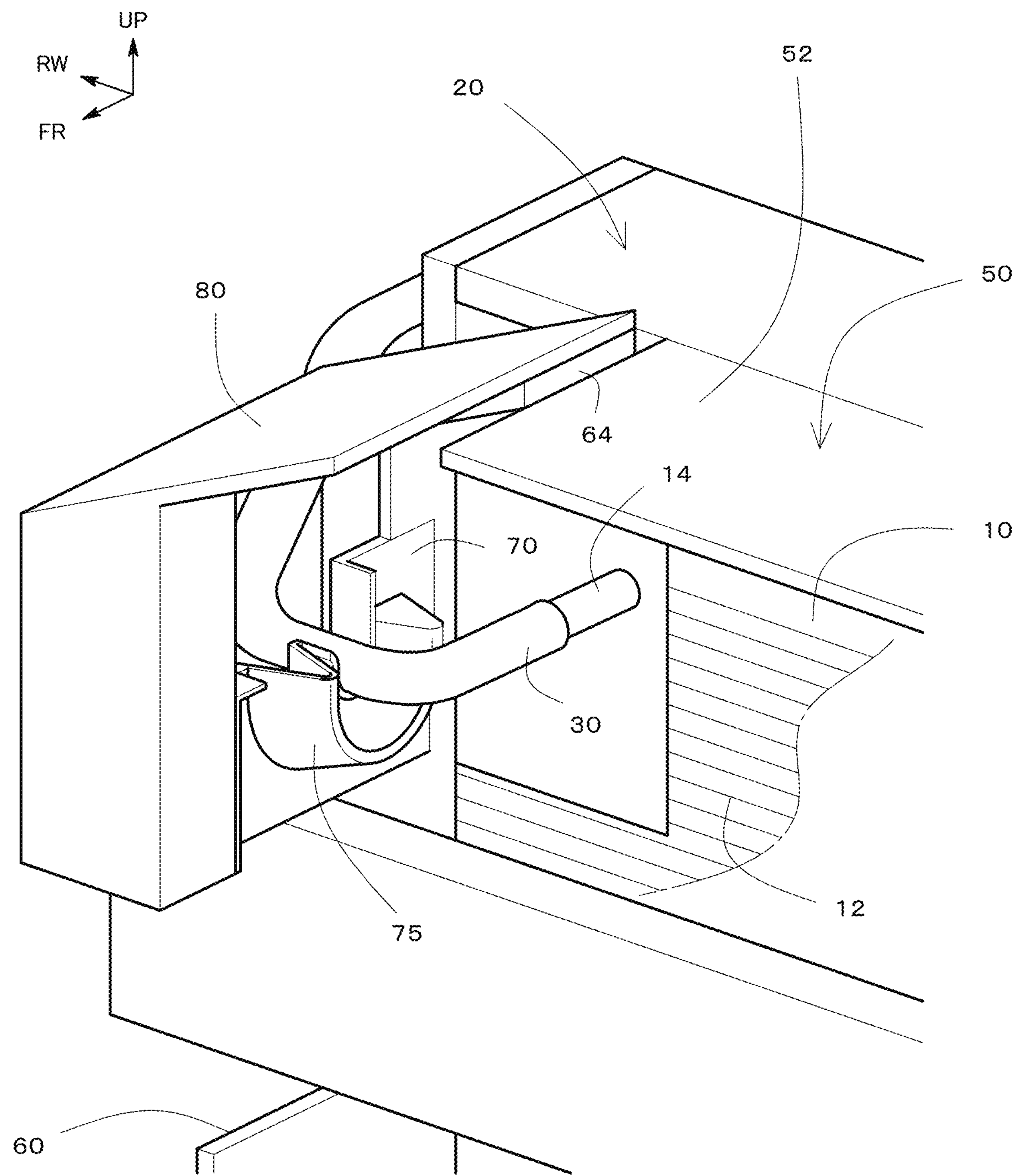
FIG. 2 is an enlarged view of FIG. 1. In this figure, the area around the radiator hose is illustrated.

FIG. 1 illustrates the front structure of a vehicle. This front structure includes a radiator 10. Also illustrated in FIG. 2 is an enlarged view. In this enlarged view, the area around the radiator hoses 30 is shown enlarged. As will be described below, this radiator pipe holding structure is equipped with an air guide duct 50.

The radiator 10 is a heat exchanger. Radiator 10 dissipates heat from the refrigerant used to cool the internal combustion engine. For example, radiator 10 is equipped with hoses and fins. Refrigerant flows through the hose. The fins are positioned around the hose. Cooling air flowing between the hose and fins dissipates the heat of the refrigerant flowing in the hose.

The radiator 10 is also part of the vehicle's air conditioning system. For example, the radiator 10 receives pressurized refrigerant from a compressor, not shown. The radiator in an air conditioning system is also called a condenser. In the following, however, the radiator in the air conditioning system and the radiator in the internal combustion engine system are collectively referred to as the radiator 10.

In addition, the vehicle may be equipped with a rotating electric machine as a drive source. In this case, the rotating electric machine, boost converter, buck converter, DC/DC converter, inverter, and other high-voltage equipment are cooled by the refrigerant. The radiator 10 also functions as a heat sink for this refrigerant. For example, radiator 10 is equipped with three independent refrigerant flow paths: the three refrigerant flow paths consist of a refrigerant flow path for the internal combustion engine system, a refrigerant flow path for the air conditioning system, and a refrigerant flow path for the high-voltage equipment.

As illustrated in FIGS. 1 and 2, radiator 10 is located in the engine compartment of a vehicle. For example, radiator 10 is located at the front end of the engine compartment. For example, the radiator 10 is a rectangular shaped device. The radiator 10 has a front surface 12 as its main surface. The front surface 12 faces toward the front of the vehicle. As illustrated in FIGS. 1 and 2, the radiator 10 has a refrigerant port 11 on its front surface 12. 4 is provided. For example, a refrigerant port 14 is provided at the upper right end of the front surface 12. The upper right end refers to the RW-axis positive end and the UP-axis positive end.

As shown in the figure, a radiator hose 30, which serves as the refrigerant flow path, is connected to the refrigerant port 14. Radiator hose 30 is a cylindrical pipe. In addition, radiator hose 30 passes from the front surface 12 of radiator 10 to the air guide duct 50 and passes through the side of the radiator 10. Furthermore, the radiator hose 30 extends further rearward of the vehicle than the radiator 10. The air guide duct 50 is provided with a retaining portion 70. This retaining portion 70 holds the radiator hose 30.

The front grille 15 is provided in front of the radiator 10. The front grille 15 is a front surface member of the vehicle. The front grille 15 is a mesh or slit-shaped member. From this front grille 15, air from outside the vehicle enters the engine compartment as cooling air. Further cooling air is sent to the radiator 10.

The radiator 10 is supported by radiator support 20. Radiator support 20 is a rectangular frame. The radiator 10 is housed and supported in the radiator support 20.

The air guide duct 50 extends forward from the radiator support 20. The air guide duct 50 is provided between the front grille 15 and the radiator 10. The air guide duct 50 is a square cylindrical shaped component. The air guide duct 50 extends from the front surface 12 of the radiator 10 in the longitudinal direction of the vehicle. The radiator 10 surrounds the front surface 12. The air guide duct 50 prevents the outside vehicle air taken in from the front grille 15 from leaking out from the side of the radiator 10. The air guide duct 50 prevents air from leaking from the sides of the radiator 10.

The air guide duct 50 is equipped with duct walls. Radiator cover 52, front bumper absorber 54, and side plates 56, 60 are included in the duct wall. Radiator cover 52 is the upper wall of air guide duct 50. Front bumper absorber 54 is the lower wall of air guide duct 50. Side plates 56, 60 are side walls of air guide duct 50. For example, the side plates 56, 60 are constructed from a plastic material such as polypropylene or polyethylene.

A retaining portion 70 is provided on the side plate 60 on the positive side of the RW axis direction. The retaining portion 70 holds the radiator hose 30. A refrigerant port 14 is located at the RW axial positive end of the front surface 12 of the radiator 10. arranged on the front surface 12 of the radiator 10. Therefore, the retaining portion 70 is provided on the side plate 60 on the positive side in the RW axial direction. For example, at the negative end in the RW axial direction of the front surface 12 of the radiator 10 (on the right side when the front surface 12 is right side of the front surface) may be provided with a refrigerant port 14. In this case, the retaining portion 70 is provided on the side plate 56 on the negative side in the RW axial direction.

Side plates 56, 60 are side walls of air guide duct 50. The side plates 56, 60 are provided with bumper cutouts 62 (see FIG. 5). A front bumper reinforcement 17 is installed in the bumper cutout 62. The front bumper reinforce 17 is a reinforcing member that extends in the vehicle width direction. In addition, a cutout 77 is formed in the side plate 60 in front of the short section 71. As will be described below, this cutout 77 allows, for example, a worker to access the PARTIALLY cut bellows portion 75 from above the side plate 60. This means that the operator can install and remove the radiator hoses 30 from above the side plate 60.

Figure 3:
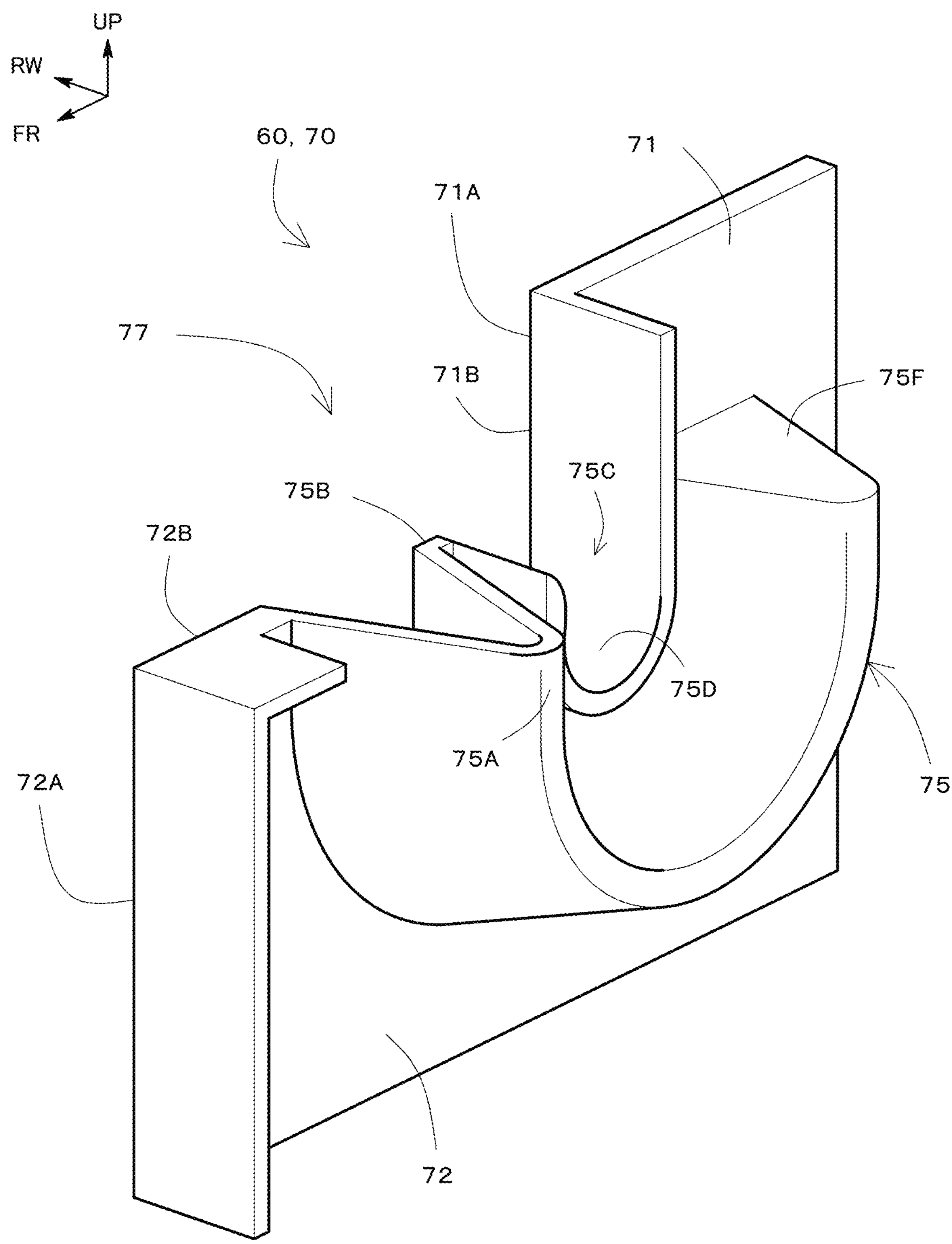
FIG. 3 is a diagrammatic view of the side plate holding portion illustrated as a stand-alone unit.
Figure 4:
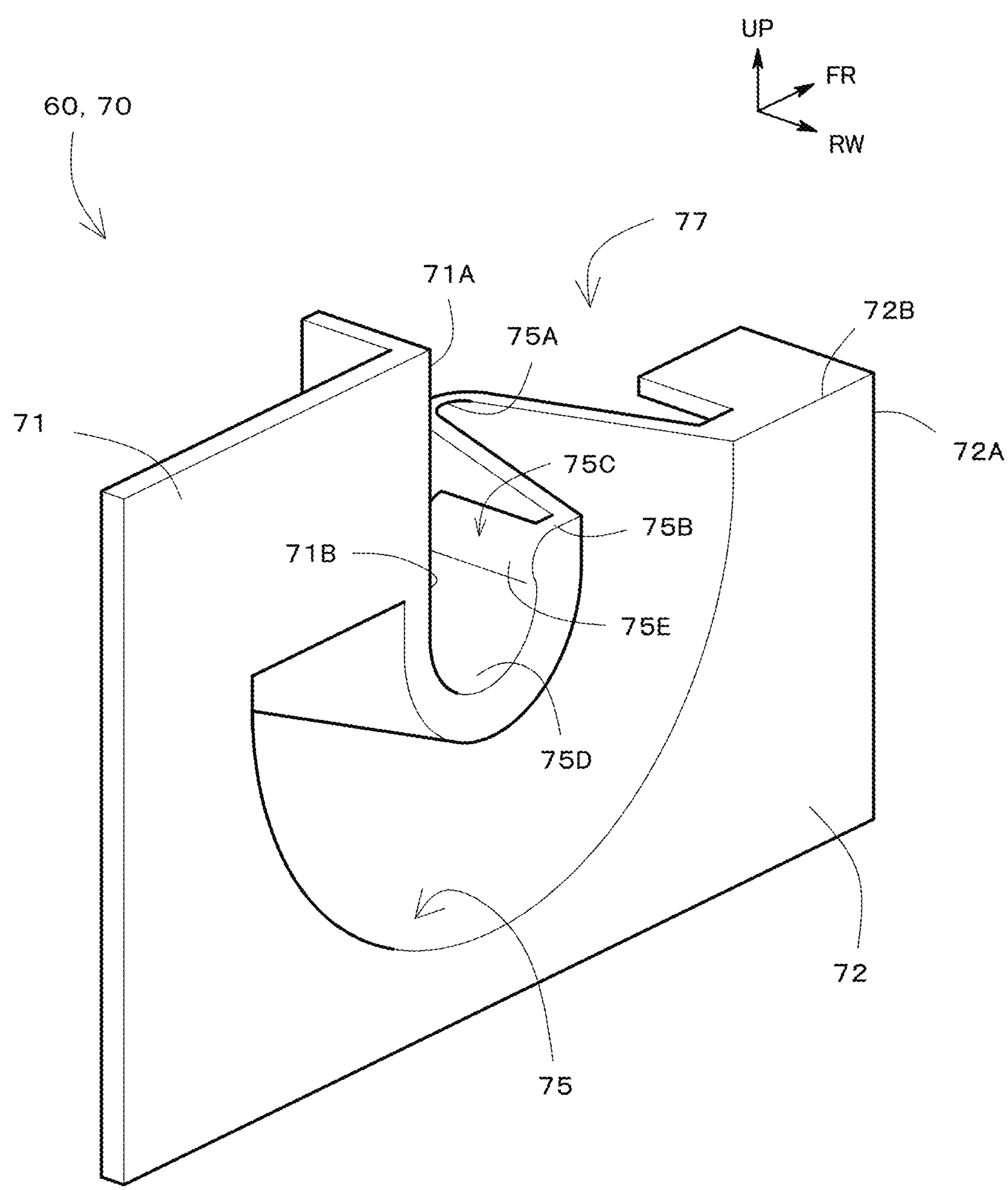
FIG. 4 is a diagrammatic view of the holding portion illustrated as a stand-alone unit. This figure reverses the viewpoint of FIG. 3.

FIG. 3 illustrates a diagrammatic view of the retaining portion 70 removed from the side plate 60. Also illustrated in FIG. 4 is a diagonal view of the retaining portion 70 rotated 180° (flipped over). The axis of rotation is the UP axis.

For example, the retaining portion 70 is integrally molded with other parts of the side plate 60. Or the retaining portion 70 is molded separately from the rest of the side plate 60. The side plate 60 and the retaining portion 70 are then welded together.

The retaining portion 70 has a short section 71, a long section 72, and a partially cut bellows portion 75. The short section 71 and the long section 72 are flat plate-shaped members. The short section 71 is shorter than the long section 72 in terms of the vehicle longitudinal dimension. The long section 72 has relatively longer vehicle longitudinal dimensions. The long section 72 extends further forward in the vehicle than the front edge 71A of the short section 71. Because of this difference in dimensions, a cutout 77 is formed in front of the short section 71.

The retaining portion 70 has a partially cut bellows portion 75 spanning from the short section 71 to the long section 72. partially cut bellows portion 75 is provided with ridge portion 75A and valley portion 75B. The ridge portion 75A and valley portion 75B are provided with concentric circles. The ridge portion 75A and valley portion 75B are formed concentrically in alternating directions. The partially cut bellows portion 75 is a cut-out ring in which the ring is partially cut open. Furthermore, the partially cut bellows portion 75 has a contact inner surface 75D. The contact inner surface 75D is in contact with the radiator hose 30. In other words, the partially cut bellows portion 75 has a ridge portion 75A and a valley portion 75A surrounding the contact inner circumferential surface 75D. 75A and valley portion 75B surround the contact inner circumferential surface 75D.

For example, the partially cut bellows portion 75 is located at the top edge 72B of the long section 72. The partially cut bellows portion 75 is open at the open end of the partially cut bellows portion 75. The partially cut bellows portion 75 is open at the top. 75C is provided as an opening for fitting the radiator hose 30 into the partially cut bellows portion 75. 75C serves as a fitting opening for fitting the radiator hose 30 into the partially cut bellows portion 75. As illustrated in FIG. 4, the contact inner surface 75D has a projection at the open end 75C. The open end 75C of the partially cut bellows portion 75 serves as a fitting opening and a fitting port for fitting into the partially cut bellows portion 75. C is a fitting opening. The radiator hose 30 is fitted into this fitting opening. The radiator hose 30 is prevented from slipping out of the partially cut bellows portion 75 by the protrusion 75E.

Figure 8:
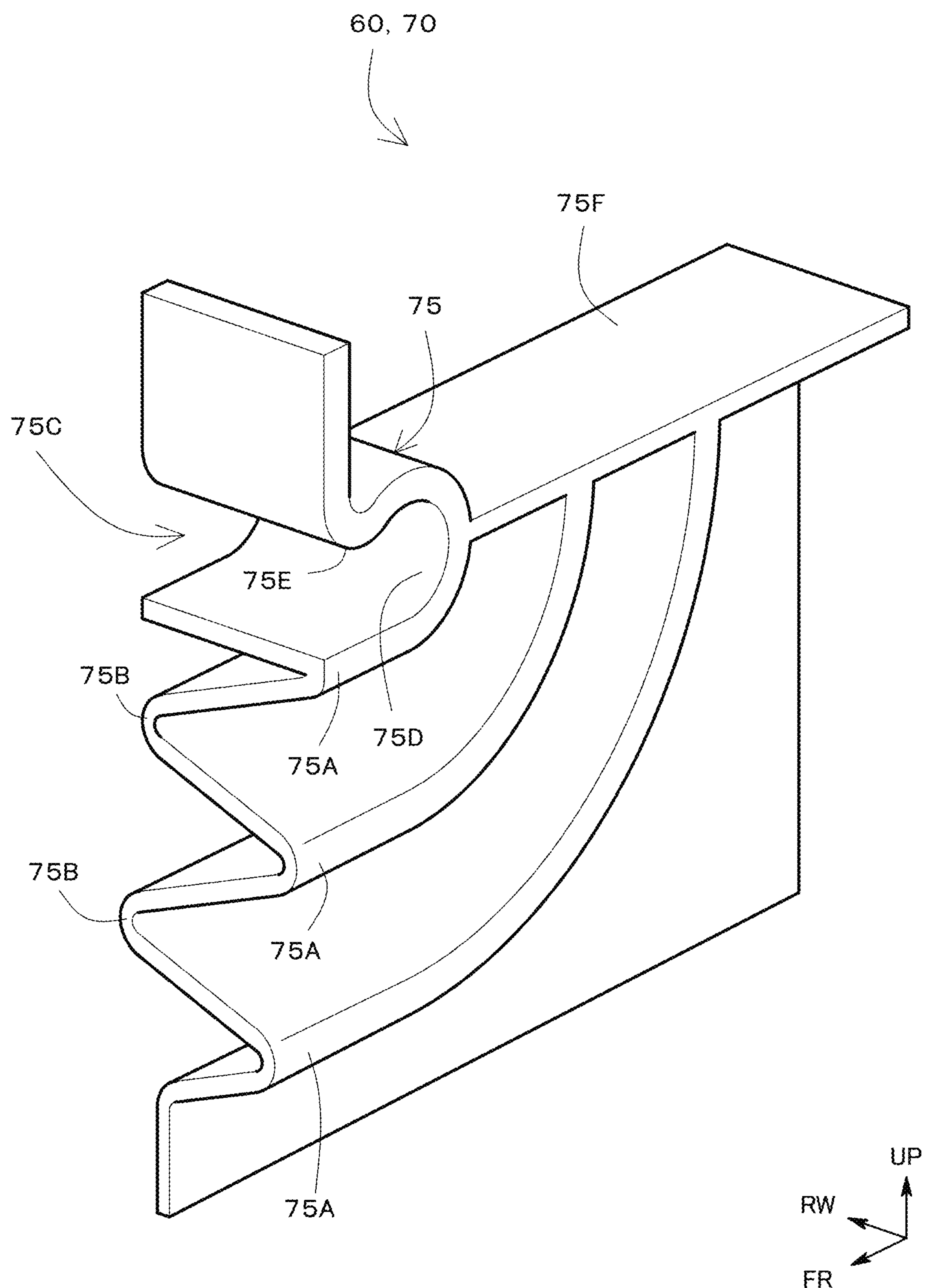
FIG. 8 illustrates a diagram of a second alternative example of a retention portion.

For example, as illustrated in FIGS. 3 and 4, the center angle (expansion angle) of the partially cut bellows portion 75 is determined to be 180°. However, the center angle of the partially cut bellows portion 75 is not limited to this example. For example, as shown in FIG. 8, the center angle of the partially cut bellows portion 75 may be 90°. For example, the center angle of the partially cut bellows portion 75 is between 90° and 360°.

As illustrated in FIGS. 3 and 4, a partially cut bellows portion 75 is provided at the top edge 72B, as illustrated in FIG. 3 and FIG. 4. In addition, the open end 75C is directed upward. These structures allow access to the partially cut bellows portion 75 from above the retaining portions 70. For example, a worker opens the front hood to open the engine compartment. In addition, the worker removes the auxiliary side piece 80 (see FIG. 1). As a result, the operator has access to the retaining portions 70.

For example, air guide duct 50 may extend to the rear end of front grille 15. In addition, a partially cut bellows portion 75 may be provided at the front end of the side plate 60. In such cases, the process of removing the front grille 15 may occur when installing and removing the radiator hoses 30. In the retaining structure of the radiator pipe of this embodiment, the open end 75C of the partially cut bellows PORTION 75 is opened upward at the upper edge 72B. As a result, the front grille 15 does not need to be removed. Besides, the operator can access the open end 75C of the partially cut bellows portion 75 from above.

When fitting the radiator hose 30 into the partially cut bellows portion 75, the radiator hose 30 is pushed into the interior of the contact inner surface 75D from the open end 75C. In response to this push, the contact inner surface 75D, the ridge portion 75A and the valley portion 75B flex and deform radially outward. Once the radiator hose 30 is accommodated within the contact inner surface 75D, the radiator hose 30 is retained in the partially cut bellows portion 75.

The radiator hose 30 is required to be securely retained. Therefore, the diameter of the radiator hose 30 may exceed the inner diameter of the contact inner surface 75D. The inner diameter of the contact inner surface 75D is the inner diameter when the hose is not retained. In other words, the radiator hose 30 flexes the partially cut bellows portion 75 radially outward. The elasticity of that partially cut bellows PORTION 75 holds the radiator hose 30. In this way, the seal between the radiator hose 30 and the contact inner surface 75D is maintained. As a result, leakage of cooling air between the radiator hose 30 and the contact inner circumferential surface 75D is inhibited.

In order to provide such flexibility as a bellows, for example, the partially cut bellows portion 75 is thinner than the short section 71 and the long portion 72. Also, to prevent wear of the radiator hose 30, the width (RW axial dimension) of the contact inner surface 75D The partially cut bellows portion 75 is formed so that the width of the contact inner surface 75D (RW axial dimension) is greater than the thickness of the short section 71 and long section 72. The bellows portion 75 is formed.

The circumferential end of the partially cut bellows portion 75, for example, is closed by the sealing strip 75F (see FIG. 3). The partially cut bellows portion 75 has a ridge portion 75A and a valley portion 75B. The ridge portion 75A and valley portion 75B form a V-shaped groove in cross section. This groove may become a leakage channel and allow cooling air to leak out of the side plate 60 (outside the vehicle width direction). Therefore, a seal piece 75F is provided at the circumferential end of the partially cut bellows portion 75. This suppresses the leakage of cooling air.

The circumferential portion of the seal piece 75F is less likely to flex than if the seal piece 75F were not provided. For example, the partially cut bellows portion 75 has two circumferential ends. The sealing strip 75F may be omitted from the circumferential end on the side closer to the projection 75E.

A straight edge 71B is formed on the front edge 71A of the short section 71. Straight edge 71B is extended in a vertical direction. The lower end of straight edge 71B is connected to the open end 75C of the partially cut bellows portion 75. For example, straight edge 71B is continuously connected to the end of the semi-circular contact inner surface 75D. A protrusion 75E (see FIG. 4) is provided opposite this connection point. With the above structure, for example, when the operator fits the radiator hose 30 into the partially cut bellows portion 75, the straight edge 71B is used as a guide edge.

Figure 5:
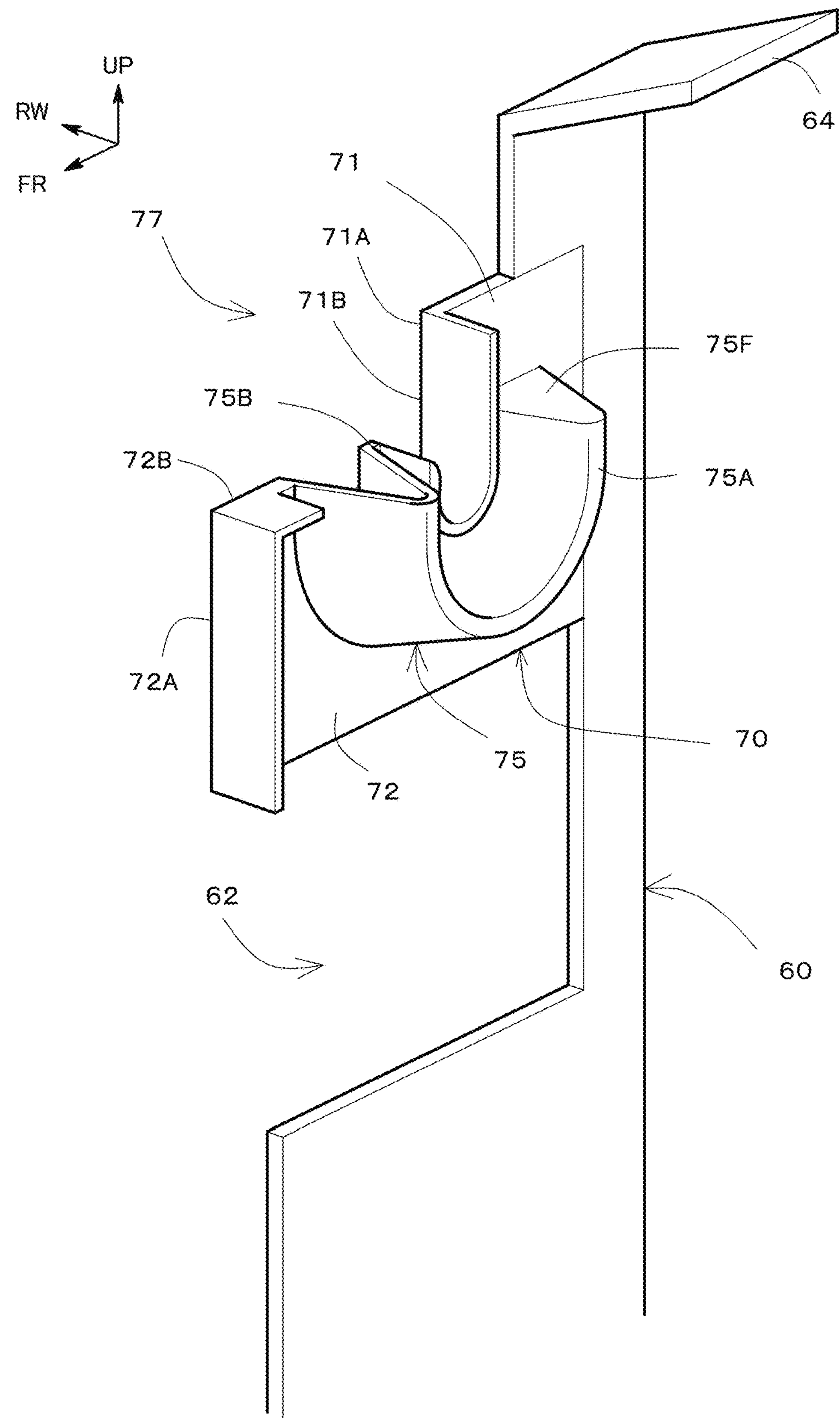
FIG. 5 illustrates an example of a diagonal view of the side plate structure.
Figure 6:
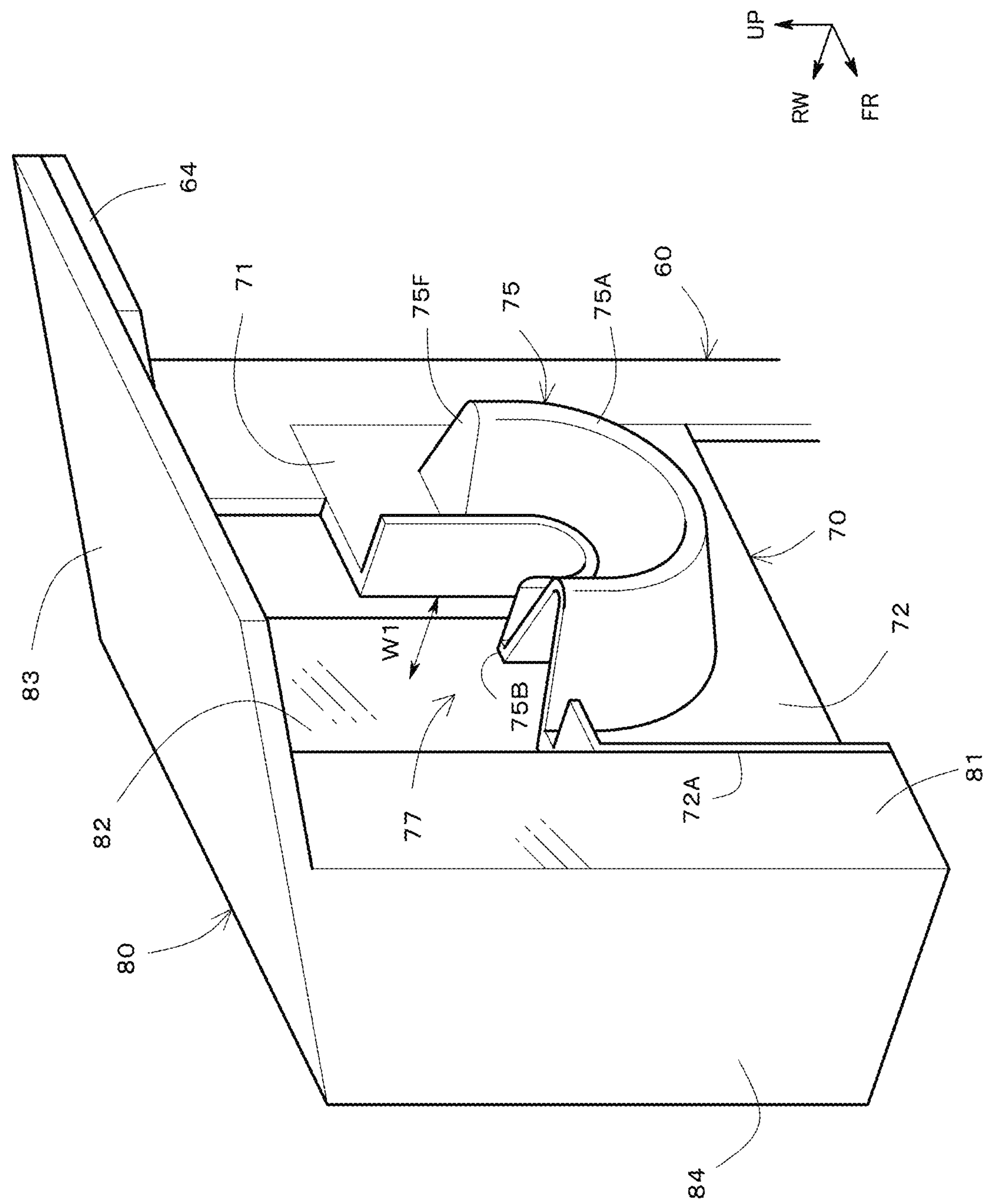
FIG. 6 illustrates a diagram of the auxiliary side piece attached to the side plate.

FIG. 5 illustrates a structure in which the retaining portion 70 is part of the side plate 60. For example, the retaining portion 70 is provided above the bumper cutout 62. Furthermore, as illustrated in FIG. 6, an auxiliary side piece 80 is provided on the side (outside of the vehicle width direction) of the retaining portion 70.

The auxiliary side piece 80 covers cutout 77 of retaining portion 70. The auxiliary side piece 80 prevents cooling air from leaking through the cutout 77. A fastening member, such as a clip not shown in the figure, for example, is inserted into a fastening hole not shown in the figure in the side plate 60. Thereby, the auxiliary side piece 80 is fastened to the side plate 60.

For example, auxiliary side piece 80 has an inner wall 81, an outer wall 82, a ceiling wall 83, and a front wall 84. The rear end of the inner wall 81 is in contact with the front edge 72A of the long section 72. The ceiling wall 83 is longer than the long section 72 in the longitudinal dimension of the vehicle. The ceiling wall 83 covers the eaves 64 of the side plate 60. Furthermore, the ceiling wall 83 covers the long section 72 for the entire length of the long section 72.

The outer wall 82 faces the short section 71 and the long section 72. Outer wall 82 is a flat plate-shaped member. The outer wall 82 is separated from the short section 71 and the long section 72. The outer wall 82 and the short section 71 are separated by a gap W1 in the vehicle width direction. Similarly, the outer wall 82 and the long section 72 are separated by a gap W1 in the width direction. The radiator hose 30 is passed through this gap W1. For example, the outer wall 82 is formed to be longer in the vehicle longitudinal direction than the long section 72. The outer wall 82 covers the cutout 77 of the retaining portion 70 from the outside in the vehicle width direction.

<Another Example of a Retaining Portion>

Figure 7:
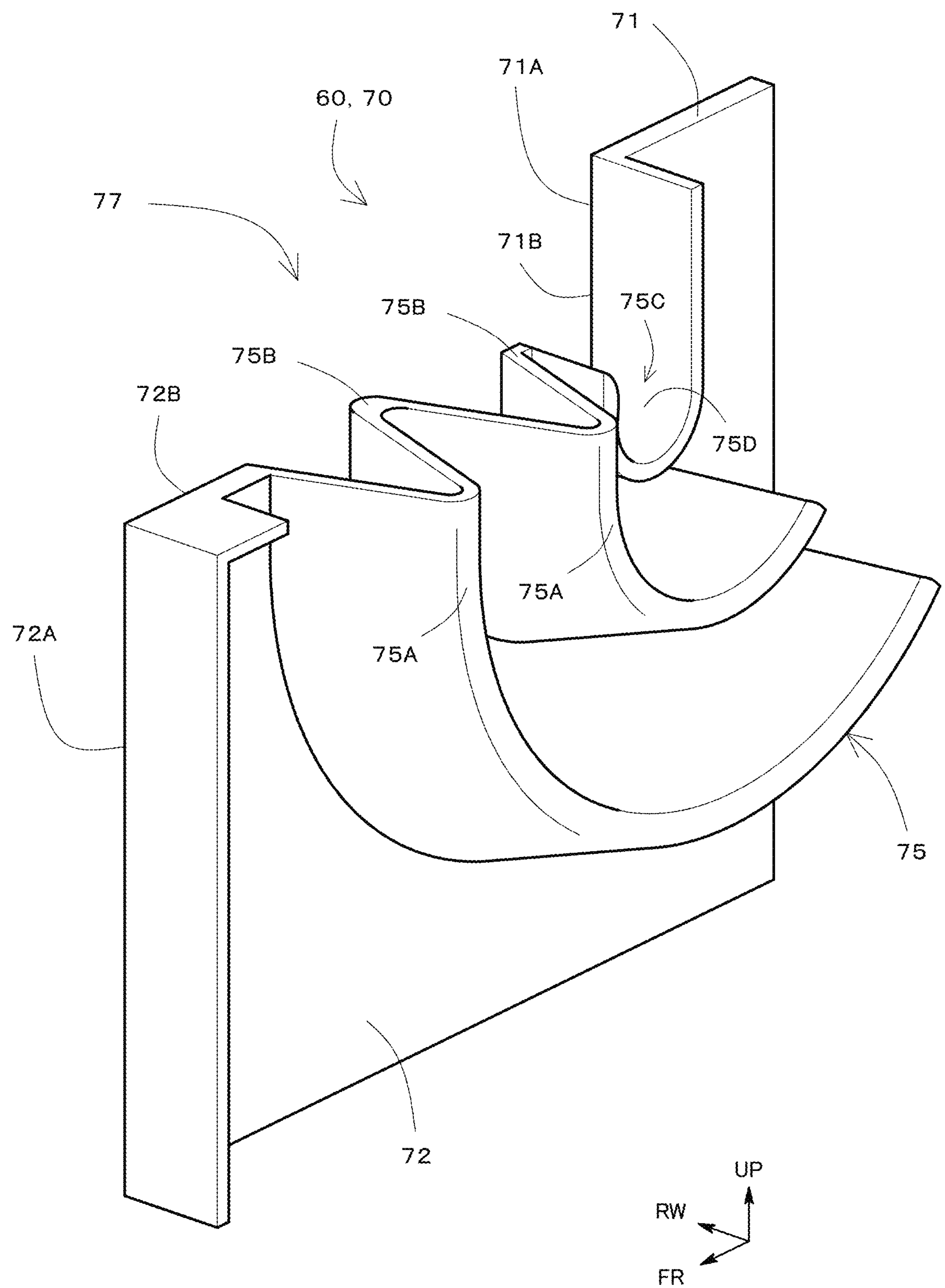
FIG. 7 illustrates a diagram of a first alternative example of a holding portion.

FIG. 7 shows another example of a holding portion 70. In this retaining portion 70, the bellows of the partially cut bellows portion 75 is multi-level. In other words, in the partially cut bellows portion 75, the cutout ring-shaped RIDGE portion 75A and VALLEY portion 75B are provided concentrically, alternately, and in multiple stages. This multi-stage bellows structure makes it possible to extend the deflection width of the partially cut bellows portion 75 compared to the single-stage bellows structure. As a result, the partially cut bellows portion 75 can accept a larger diameter radiator hose 30.

FIG. 8 also shows an example of a partially cut bellows PORTION 75 with a multi-stage bellows structure. In this example, the retaining portion 70 do not form short sections 71 and long sections 72. Instead, a partially cut bellows portion 75 is formed at the front end of the retaining portion 70. The open end 75C of partially cut bellows portion 75 is provided at the front.

As described above, the retaining structure of the radiator pipe is illustrated in FIGS. 1-8. According to this retention structure, the radiator hose 30 is retained on the side plate 60 by simply fitting the radiator hose 30 from the open end 75C of the partially cut bellows portion 75. The radiator hose 30 is retained on the side plate 60 by simply fitting the radiator hose 30 through the open end 75C of the partially cut bellows portion 75.

The present disclosure is not limited to the present embodiments described above, and includes all changes and modifications without departing from the The present disclosure is not limited the present embodiments described above and includes all changes and modifications without departing from the technical scope or the essence of the present disclosure defined by the claims.

The invention claimed is:

1. A radiator pipe retaining structure for retaining a cylindrical pipe connected to a refrigerant port disposed on a front surface of a radiator, the retaining structure comprising:

an air guide duct formed in a rectangular cylindrical shape and disposed between the radiator and a front grille located in front of the radiator, the air guide duct extending along a longitudinal direction of a vehicle so as to surround the front surface of the radiator, wherein a duct wall constituting a part of the rectangular shape of the air guide duct includes a retaining portion configured to retain the cylindrical pipe, and the retaining portion comprises a partially cut bellows portion in which ridge and valley portions are concentrically alternated, the ridge and valley portions being in a shape of the partially removed open rings.

2. The radiator pipe retaining structure according to claim 1, wherein the duct wall constitutes a side wall of the air guide duct, the side wall having a short section which is relatively short in the longitudinal direction of the vehicle and a long section which is provided below the short section and extends forward of the vehicle beyond a front end edge of the short section, and the partially cut bellows portion is formed at an upper end edge of the long section, with a top of the partially cut bellows portion being open.

3. The radiator piping radiator pipe retaining structure according to claim 2, wherein a straight edge extending in a vertical direction is provided on a front end of the short section, and an open end of the partially cut bellows portion is connected to a lower end of the straight edge.

4. The radiator piping radiator pipe retaining structure according to claim 2, further comprising an auxiliary side member designed to cover an open region located forward the short section.

5. The radiator pipe retaining structure according to claim 1, further comprising a sealing piece arranged on a circumferential end of the partially cut bellows portion, to close the circumferential end.

* * * * *